US012340439B1

(12) United States Patent
Choi et al.

(10) Patent No.: US 12,340,439 B1
(45) Date of Patent: Jun. 24, 2025

(54) METHOD AND APPARATUS FOR ADAPTIVELY EXTRAPOLATING IMAGE THROUGH GRAPH-BASED PATCH REARRANGEMENT, AND COMPUTER PROGRAM

(71) Applicant: CHUNG ANG UNIVERSITY INDUSTRY ACADEMIC COOPERATION FOUNDATION, Seoul (KR)

(72) Inventors: Jong Won Choi, Gyeongsangnam-do (KR); Hyoung Jun Lim, Gyeonggi-do (KR); Joo Young Lee, Seoul (KR); Soo Hyun Park, Gangwon-do (KR)

(73) Assignee: CHUNG ANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 0 days.

(21) Appl. No.: 18/892,812

(22) Filed: Sep. 23, 2024

(30) Foreign Application Priority Data

Dec. 22, 2023 (KR) .................... 10-2023-0189564

(51) Int. Cl.
*G06T 11/00* (2006.01)
*G06T 5/20* (2006.01)
(Continued)

(52) U.S. Cl.
CPC ............... *G06T 11/00* (2013.01); *G06T 5/20* (2013.01); *G06T 5/70* (2024.01); *G06V 10/26* (2022.01);
(Continued)

(58) Field of Classification Search
CPC ... G06T 11/00; G06T 5/20; G06T 5/70; G06T 2207/20021; G06T 2207/20081;
(Continued)

(56) References Cited

U.S. PATENT DOCUMENTS

2017/0365037 A1\* 12/2017 Urban .................... G06T 3/403
2020/0125897 A1\* 4/2020 Wang .................... G06N 3/045
(Continued)

FOREIGN PATENT DOCUMENTS

KR 10-2017-0097745 A 8/2017
KR 10-2019-0080737 A 7/2019

OTHER PUBLICATIONS

Li et al, Contextual Outpainting with Object-Level Contrastive Learning, 2022 IEEE/CVF Conference on Computer Vision and Pattern Recognition (CVPR) (Year: 2022).\*
(Continued)

*Primary Examiner* — Andrae S Allison
(74) *Attorney, Agent, or Firm* — The PL Law Group, PLLC (57) ABSTRACT

A method for adaptively extrapolating an image extrapolates an image adaptively so that the image estimated by the extrapolation technique can express realistic content and maintain structural similarity with the given image. The method can ensure that the region between the extrapolated region and the original region maintains the same resolution, and it can ensure contextual consistency by preserving the features of the adjacent region and the distant region.

9 Claims, 6 Drawing Sheets

(51) Int. Cl.
*G06T 5/70* (2024.01)
*G06V 10/26* (2022.01)
*G06V 10/50* (2022.01)
*G06V 10/82* (2022.01)

(52) U.S. Cl.
CPC ............. *G06V 10/50* (2022.01); *G06V 10/82* (2022.01); *G06T 2207/20021* (2013.01); *G06T 2207/20081* (2013.01); *G06T 2207/20084* (2013.01)

(58) Field of Classification Search
CPC .......... G06T 2207/20084; G06V 10/26; G06V 10/50; G06V 10/82
See application file for complete search history.

(56) References Cited

U.S. PATENT DOCUMENTS

| | | | | |
|---|---|---|---|---|
| 2021/0089878 | A1* | 3/2021 | Greenewald | G06N 3/047 |
| 2021/0150269 | A1* | 5/2021 | Choudhury | G06V 30/1985 |
| 2021/0350620 | A1* | 11/2021 | Bronstein | G06N 20/00 |
| 2022/0230712 | A1* | 7/2022 | Sheberla | G16C 20/10 |
| 2022/0277218 | A1* | 9/2022 | Fan | G06N 3/08 |
| 2022/0383108 | A1* | 12/2022 | Cheng | G06N 3/09 |
| 2023/0071008 | A1* | 3/2023 | Dozen | G06V 30/16 |

OTHER PUBLICATIONS

Xu et al, How Neural Networks Extrapolate: From Feedforward To Graph Neural Networks, Published as a conference paper at ICLR 2021 (Year: 2021).*

Xiaoqiang Zhou et al, "Image Inpainting with Contrastive Relation Network", 2020 25th International Conference on Pattern Recognition (ICPR), Jan. 10-15, 2021, pp. 4420-4427, DOI: 10.1109/ICPR48806.2021.9412640.

Jiacheng Li et al: "Contextual Outpainting With Object-Level Contrastive Learning", Proceedings of the IEEE/CVF Conference on Computer Vision and Pattern Recognition (CVPR), Jun. 19-24, 2022, pp. 11451-11460.

* cited by examiner

METHOD AND APPARATUS FOR ADAPTIVELY EXTRAPOLATING IMAGE THROUGH GRAPH-BASED PATCH REARRANGEMENT, AND COMPUTER PROGRAM

CROSS-REFERENCE TO RELATED APPLICATION AND CLAIM OF PRIORITY

This application claims the benefit under 35 USC § 119 of Korean Patent Application No. 10-2023-0189564, filed on Dec. 22, 2023, in the Korean Intellectual Property Office, the entire disclosure of which is incorporated herein by reference for all purposes.

BACKGROUND

1. Technical Field

Embodiments described herein relate to a technology for adaptively extrapolating an image through graph-based patch rearrangement.

2. Description of Related Art

Image extrapolation technology, also commonly known as image out painting, is a technology for harmoniously extending new content beyond the boundaries of a given image.

Unlike image inpainting, which utilizes the visual context surrounding an inpainting region, image extrapolation is a challenging task due to the lack of visual surrounding information at the boundaries of a target image. In addition, in the image extrapolation, a generated region should maintain resolution and maintain the semantic content of an original image even if the surrounding information is lacking.

Therefore, image extrapolation tasks face challenges related to high quality textures and raw resolution degradation. This performance degradation is typically caused by accumulated errors that occur when previously created regions are repeatedly referenced. That is, maintaining the raw resolution and texture of the original domain remains a difficult problem in extrapolation tasks.

SUMMARY

The present disclosure was derived from this technical background, and the purpose thereof is to provide a method for adaptively extrapolating an image by which an image estimated by image extrapolation technology may represent realistic content and maintain structural similarity to a given image, which may ensure that a region between an extrapolated region and the original region maintains the same resolution, and which may ensure contextual consistency by preserving features of an adjacent region and distant region.

The present disclosure for achieving the above problems includes the following configuration.

That is, a method for adaptively extrapolating an image according to an embodiment of the present disclosure is a method, which is performed on a computing device including one or more processors and a memory that stores one or more programs to be executed by the one or more processors, including dividing an input image in a grid pattern and constructing patches of at least some regions as a pool of candidate patches, deriving a graph-based target feature by replacing one patch in the constructed pool of candidate patches with a blank patch, performing learning so that it is to be closer to a feature of the patch replaced by the blank patch and farther away from features derived from regions other than the pool of candidate patches through contrastive learning between the derived graph-based target feature, the feature of the patch replaced by the blank patch, and the feature derived from the regions other than the pool of candidate patches, selecting one of the patches included in the input image as a patch to be inserted into a grid-based pool of extrapolated region based on the learning result, and repeatedly performing the selecting by inserting the selected patch to be inserted into the pool of extrapolated region and reselecting a pool of extrapolated region.

Meanwhile, an apparatus for adaptively extrapolating an image according to an embodiment of the present disclosure is a computer device including one or more processors and a memory that stores one or more programs to be executed by the one or more processors, and includes a construction module that divides an input image into a grid pattern and constructs patches of at least some areas as a pool of candidate patches, a derivation module that derives a graph-based target feature by replacing one patch in the constructed pool of candidate patches with a blank patch, a learning module that performs learning so that it is to be closer to a feature of the patch replaced by the blank patch and farther away from features derived from regions other than the pool of candidate patches through contrastive learning between the derived graph-based target feature, the feature of the patch replaced by the blank patch, and the feature derived from the regions other than the pool of candidate patches, a selection module that selects one of the patches included in the input image as a patch to be inserted into a grid-based pool of extrapolated region based on the learning result, and an insertion module that repeatedly performs the selection of the patch to be inserted into the pool of extrapolated region by inserting the selected patch to be inserted into the pool of extrapolated region and reselecting a pool of extrapolated region.

The present disclosure has the effect of providing a method for adaptively extrapolating an image by which an image estimated by extrapolation technology can represent realistic content and maintain structural similarity to a given image, which can ensure that a region between an extrapolated region and the original region maintains the same resolution, and which can ensure contextual consistency by preserving features of an adjacent region and distant region.

In addition, the present disclosure can provide high-quality extrapolation results that are both quantitatively and qualitatively excellent, and reduce the possibility of error accumulation, resulting in an efficiency improvement effect that can process various resolutions for images generated without additional learning.

DETAILED DESCRIPTION

Hereinafter, a specific embodiment of the present disclosure will be described with reference to the drawings. The following detailed description is provided to aid in a comprehensive understanding of the methods, apparatus and/or systems described herein. However, this is illustrative only, and the present disclosure is not limited thereto.

In describing the embodiments of the present disclosure, when it is determined that a detailed description of related known technologies may unnecessarily obscure the subject matter of the present disclosure, a detailed description thereof will be omitted. Additionally, terms to be described later are terms defined in consideration of functions in the present disclosure, which may vary according to the intention or custom of users or operators. Therefore, the definition should be made based on the contents throughout this specification. The terms used in the detailed description are only for describing embodiments of the present disclosure, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

In addition, terms such as first, second, etc. may be used to describe various components, but the components should not be limited by the terms. The above terms may be used for the purpose of distinguishing one component from another component. For example, a first component may be referred to as a second component without departing from the scope of the present disclosure, and similarly, a second component may also be referred to as a first component.

The method for adaptively extrapolating an image through patch rearrangement according to an embodiment allows the estimated image to represent realistic content and maintain structural similarity with a given image for the framework design, ensures that the region between the extrapolated region and the original region maintains the same resolution, and preserves the features of adjacent region and distant regions to ensure contextual consistency.

The method for adaptively extrapolating an image through graph-based patch rearrangement according to an embodiment generates a natural image with high resolution by generating and expanding a region outside a specific image when given the specific image.

To this end, a texture preserving network (TPRNet) that effectively reuses original visual information of an input image to preserve texture details and the raw resolution of the input image may be introduced.

That is, patches extracted from the input image may be used to fill in empty boundary regions arranged according to individual and overall structures.

In addition, a graph-based feature representation model for effectively rearranging patches for unknown regions while preserving local and structural context for newly generated regions is proposed.

That is, as the method for adaptively extrapolating an image through graph-based patch rearrangement according to an embodiment, a method for adaptively extrapolating an image that can effectively preserve texture and resolution by rearranging patches of a given image to fill empty boundary regions may be proposed. In the method for adaptively extrapolating an image, a diffusion-based integration module that effectively preserves texture details in a case where the visual diversity of patches extracted from the input image is insufficient to generate all boundary regions may also be introduced.

The rearrangement process may rely on graph-based features where both contextual and structural information collaborate to identify an optimal patch for each location.

Hereinafter, preferred embodiments according to the present disclosure will be described in detail with reference to the accompanying drawings.

An apparatus for adaptively extrapolating an image through graph-based patch rearrangement according to embodiments of the present disclosure may be implemented by at least one computer device, and a method for adaptively extrapolating an image through graph-based patch rearrangement according to embodiments of the present disclosure may be performed through at least one computer device included in the apparatus for adaptively extrapolating an image through graph-based patch rearrangement. In this case, a computer program according to an embodiment of the present disclosure may be installed and run on the computer device, and the computer device may perform the method for adaptively extrapolating an image through graph-based patch rearrangement according to embodiments of the present disclosure under the control of the run computer program. The computer program described above may be combined with the computer device and stored in a computer-readable recording medium to cause the computer to execute the method for adaptively extrapolating an image through graph-based patch rearrangement.

Figure 1:
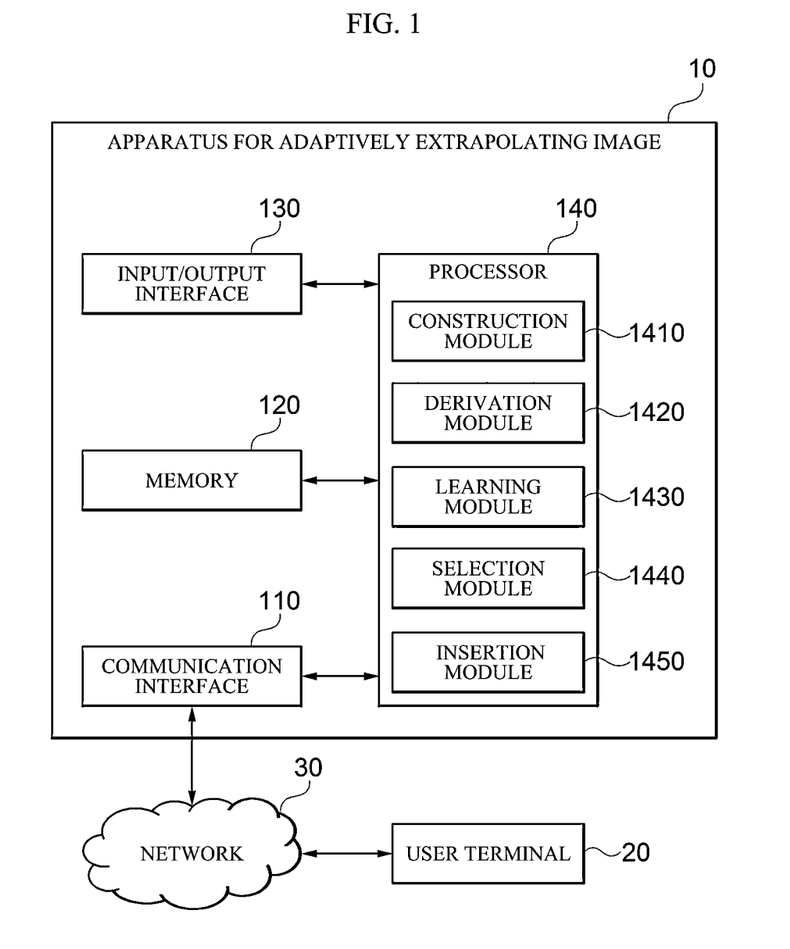
FIG. 1 is a block diagram of an apparatus for adaptively extrapolating an image through graph-based patch rearrangement according to an embodiment of the present disclosure.

FIG. 1 is a block diagram of an apparatus for adaptively extrapolating an image through graph-based patch rearrangement according to an embodiment of the present disclosure.

Referring to FIG. 1, an apparatus for adaptively extrapolating an image 10 through graph-based patch rearrangement according to an embodiment includes a communication interface 110, a memory 120, an input/output interface 130, and a processor 140.

The communication interface 110 may provide a function for the apparatus for adaptively extrapolating an image 10 through graph-based patch rearrangement to communicate with other devices through a network. As an example, requests, commands, data, files, etc. generated by the processor 140 of the apparatus for adaptively extrapolating an image 10 through graph-based patch rearrangement according to program code stored in a recording device such as the memory 120 may be transmitted to other devices, such as the apparatus for adaptively extrapolating an image 10 through graph-based patch rearrangement, through the network under the control of the communication interface 110.

Conversely, signals, commands, data, files, etc. from other devices may be received through the communication interface 110 of the apparatus for adaptively extrapolating an image 10 through graph-based patch rearrangement via a network. The signals, commands, data, etc. received through the communication interface 110 may be transmitted to the processor 140 or memory 120, and the files, etc. may be stored in the storage medium (the persistent storage device described above) that the apparatus for adaptively extrapolating an image 10 through graph-based patch rearrangement may further include.

A network 30 may include any one or more networks among networks such as a personal area network (PAN) a local area network (LAN), a campus area network (CAN), a metropolitan area network (MAN) a, wide area network (WAN), a broadband network (BBN), and the Internet. In addition, the network may include, but is not limited to, any one or more of network topologies including a bus network, a star network, a ring network, a mesh network, a star-bus network, a tree or hierarchical network, etc.

A user terminal 20 may be applied to various terminals such as a smart phone, a portable terminal, a mobile terminal, a foldable terminal, a personal digital assistant (PDA), a portable multimedia player (PMP) terminal, a telematics terminal, a navigation terminal, a personal computer, a notebook computer, a slate PC, a tablet PC, an ultrabook, a wearable device (including, e.g., a smartwatch, a smart glass, a head mounted display (HMD), etc.), a WiBro terminal, an internet protocol television (IPTV) terminal, a smart TV, a digital broadcasting terminal, an audio video navigation (AVN) terminal, an audio/video (A/V) system, a flexible terminal, a digital signage device, etc.

The memory 120 is a computer-readable recording medium, and may include a permanent mass storage device such as a random access memory (RAM), a read only memory (ROM), a disk drive, and a server. Here, the non-permanent large-capacity recording devices such as the ROM and disk drive are separate permanent storage devices distinct from the memory 120, and may be included in the apparatus for adaptively extrapolating an image 10 through graph-based patch rearrangement.

In addition, an operating system and at least one program code may be stored in the memory 120. These software components may be loaded into the memory 120 from a computer-readable recording medium separate from the memory 120. Such a separate computer-readable recording medium may include a computer-readable recording medium such as a floppy drive, a disk, a tape, a DVD/CD-ROM drive, a memory card, an SSD, and a USB.

In another embodiment, software components may be loaded into the memory 120 through the communication interface 110 rather than a computer-readable recording medium. For example, software components may be loaded into the memory 120 of the apparatus for adaptively extrapolating an image 10 through graph-based patch rearrangement based on a computer program installed by files received through a network.

The input/output interface 130 may be a means for interfacing with an input/output device. For example, an input device of the input/output device may include a device such as a microphone, keyboard, or mouse, and an output device thereof may include a device such as a display or speaker. As another example, the input/output interface 130 may be a means for interfacing with a device that integrates functions for input and output into one, such as a touch screen. The input/output device may be composed of a single device by being integrated with the apparatus for adaptively extrapolating an image 10 through graph-based patch rearrangement.

The processor 140 may be configured to process instructions of a computer program by executing basic arithmetic, logic, and input/output operations. Instructions may be provided to the processor 140 using the memory 120 or the communication interface 110. For example, the processor 140 may be configured to execute received instructions according to program codes stored in a recording device such as the memory 120.

The processor 140 of the apparatus for adaptively extrapolating an image 10 through graph-based patch rearrangement according to an embodiment includes a construction module 1410, a derivation module 1420, a learning module 1430, a selection module 1440, and an insertion module 1450.

In an embodiment, the construction module 1410 divides an input image into a grid pattern and constructs patches of at least some areas as a pool of candidate patches.

Then, the derivation module 1420 replaces one patch with a blank patch in the pool of candidate patches constructed by the construction module 1410 to derive a graph-based target feature.

After that, the learning module 1430 performs learning so that it is to be closer to a feature of the patch replaced by the blank patch and farther away from features derived from regions other than the pool of candidate patches through contrastive learning between the derived graph-based target feature, the feature of the patch replaced by the blank patch, and the features derived from the regions other than the pool of candidate patches.

Then, the selection module 1440 selects one of the patches included in the input image as a patch to be inserted into a grid-based pool of extrapolated region based on the learning result, and the insertion module 1450 may expand the image extrapolated region by repeatedly performing a process of inserting the patch selected by the selection module 1440 to be inserted into the pool of extrapolated region and reselecting a pool of extrapolated region.

Figure 2:
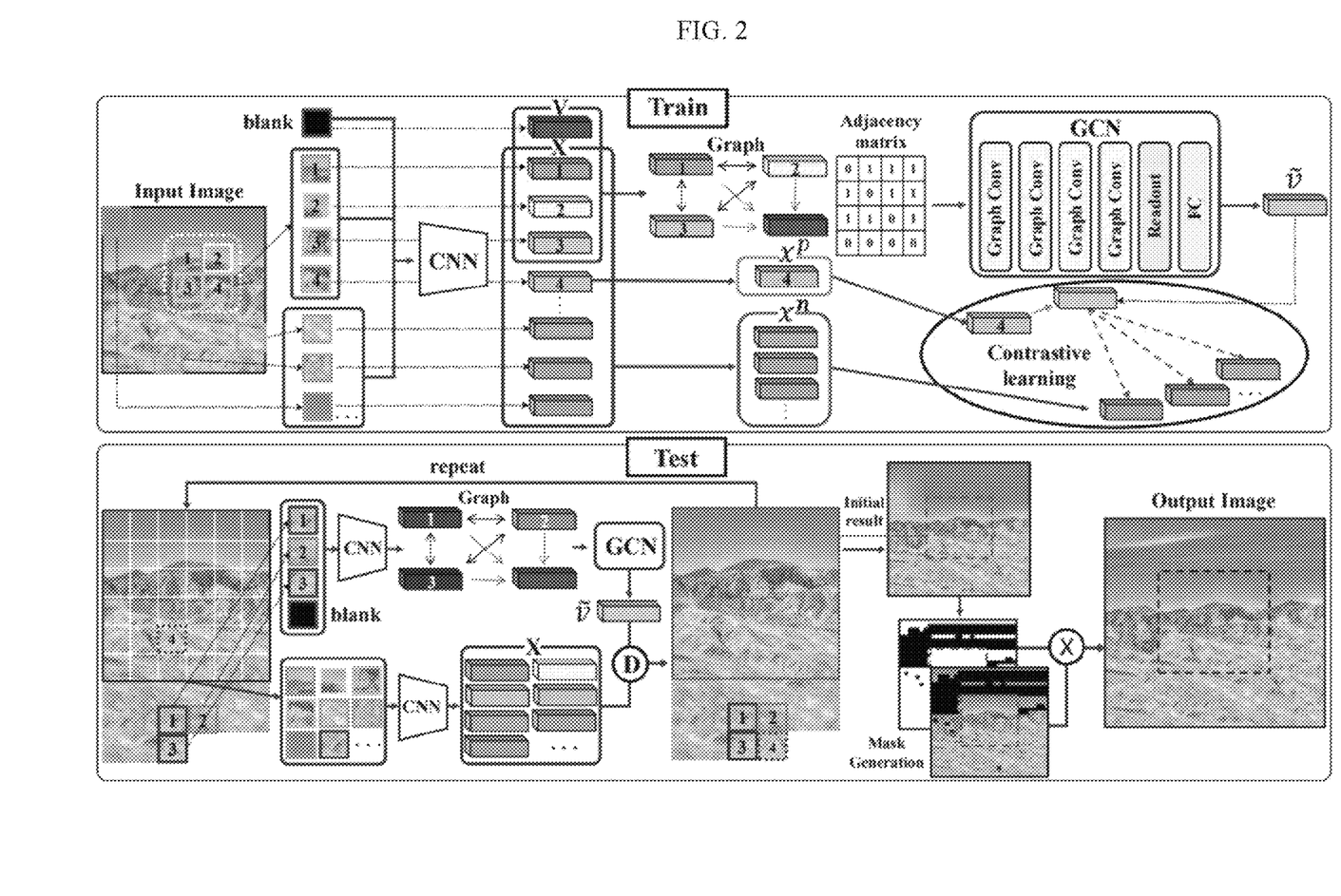
FIG. 2 is an exemplary diagram showing the overall framework of a method for adaptively extrapolating an image through graph-based patch rearrangement according to an embodiment of the present disclosure.

FIG. 2 is an exemplary diagram showing the overall framework of a method for adaptively extrapolating an image through graph-based patch rearrangement according to an embodiment of the present disclosure.

In an embodiment, in the method for adaptively extrapolating an image through graph-based patch rearrangement, a patch selection module repeatedly selects the best patch at a boundary considering both local and structural similarities with neighboring regions. Next, a diffusion integration module regenerates an incomplete region where visual information for each patch is insufficient for estimation, and repeatedly selects the best patch.

That is, in the framework for performing the method for adaptively extrapolating an image shown in FIG. 2, an original patch is reconstructed to estimate an unknown boundary region according to a semantic distance trained with a graph convolutional network (GCN). The GCN is trained in a self-supervised manner to reduce graph-based features and patch-based features. After completing patch reconstruction, the diffusion integration module can improve visual artifacts in an initial result image.

More specifically, referring to FIG. 2, first, an original input image is divided into a grid pattern to construct a pool of candidate patches. Then, the patch selection module selects a patch most suitable for a target boundary. In this case, a selection score can be estimated through a geometric-aware semantic patch encoder capable of recognizing local and structural similarity between a candidate patch and an adjacent patch.

Then, the step of selecting is performed repeatedly until an initial result image having target resolution is obtained.

In an embodiment, the geometric-aware semantic patch encoder may construct a pool of candidate patches by dividing an input image of size H×W×3 into grids each having a size of P×P, as an example.

Then, all candidate patches of the constructed pool of candidate patches are input into a pre-trained convolutional neural network (CNN) to extract local semantic information about the patches.

Extracted features are candidate features $X=[x_1, x_2, \ldots, x_N]$. Here, $xi \in R^D$, a feature size is D and the number of candidate patches is N.

Then, in order to select an optimal patch to replace a specific blank region on the boundary, graph-based target feature $\tilde{v}$ is extracted using adjacent patches of a target blank region.

A graph is created using the upper, left-hand, and upper left-hand patches of the blank region from the pool of candidate patches. In this case, since information cannot be derived from the blank patch, an adjacency matrix excluding directional connections from the blank patch to the adjacent patches is created and applied. A 4×4 adjacency matrix A consists of elements 0 and 1, where 1 is set as a directional connection.

Accordingly, the graph contains 4 nodes with one fixed adjacency matrix, and node features are values extracted by feeding patches to the pre-trained CNN used for extraction of candidate features, and features of the upper left-hand, upper, left-hand, and blank patches are denoted as $v_1$, $v_2$, $v_3$, and $v_4$, respectively.

Then, a node feature matrix V can be constructed by connecting the node features as follows $$V=[V_1^T; V_2^T; V_3^T; V_4^T] \in R^{4 \times D}$$

The node feature matrix V and the adjacency matrix A are supplied to the graph convolutional network (GCN). Each layer of the GCN operates as shown in Equation 1.

$$V^{(l+1)} = \tilde{D}^{-\frac{1}{2}} \tilde{A} \tilde{D}^{-\frac{1}{2}} V^{(l)} W \quad \text{[Equation 1]}$$

Here, Ã is an adjacency matrix added by self-connection from the adjacency matrix A. In this case, Ã=A+I, D̃ is a diagonal matrix of Ã (e.g., D̃(k,k)=$\Sigma_j$Ã(k, j)), $W \in R^{D \times D}$ is a learnable weight matrix of GCN, and l represents an index of a GCN layer, where $V^{(0)}=V$ in the first GCN layer.

Then, the graph-based target feature $\tilde{v}$ can be derived as shown in Equation 2 by integrating node feature vectors of the last GCN layer.

$$V^{(l+1)} = \tilde{D}^{-\frac{1}{2}} \tilde{A} \tilde{D}^{-\frac{1}{2}} V^{(l)} W \quad \text{[Equation 2]}$$

Here, $V_i^{(L)}$ is the i-th row vector of $V^{(L)}$, L is the number of GCN layers, g(·) is a fully connected layer as a linear projection layer, and τ(·) is an ReLU activation function. As a result, the size of the graph-based target feature $\tilde{v}$ is $R^D$.

In an embodiment, as shown in FIG. 2, the encoder for training includes one CNN and one GCN for extracting a feature for each patch and a graph-based feature, respectively.

First, a training image is divided into a grid pattern, and the GCN layer and the fully connected layer g of the GCN are updated while parameters of the pre-trained CNN are frozen for extraction of the feature for each patch divided into the grid pattern of the input image. The pre-trained CNN is updated to not only process different types of input images, but also focus on structural relationships between adjacent patches.

According to an embodiment, a patch with the closest distance between the graph-based target feature and the patch-based feature is derived from the candidates most suitable for the target blank patch using contrastive learning. That is, a triplet loss in which the graph-based target feature acts as an anchor while a positive sample and a negative sample are extracted from patch-based features of the candidate is designed.

The input image for training is divided on a grid basis and four adjacent patches in a 2×2 shape formed by patches of graph-based target features are selected. Then, the bottom right patch is replaced with a blank patch and extract the i-th graph-based feature $\tilde{v}_i$. Since the original patch replaced by the blank patch is the best candidate for the anchor, the patch-based feature $x_i^p$ is extracted as a positive sample. Then, a negative sample $x_j^n$ is extracted from a randomly selected patch among the four selected patches. The design of the triple loss extracted from the patch-based features may be derived as Equation 3.

$$\mathcal{L}_{tri} = \sum_{i=1}^{N} \left[ \|\tilde{v}_i - x_i^p\|_2^2 - \sum_{j=1}^{M} \|\tilde{v}_i - x_j^n\|_2^2 + \zeta \right]_+ \quad \text{[Equation 3]}$$

Here, $[\cdot]_+$ is a function that makes all negative values 0 while maintaining positive values, $\zeta$ represents a preset margin for triplet loss, M is the number of negative samples, and N is a batch size.

The first term increases a feature distance between a graph-based anchor feature and a patch-based negative feature while decreasing a feature distance between the graph-based anchor feature and a patch-based positive feature. Accordingly, an image patch with the closest semantic distance may be applied to a boundary of an expanded region of the input image.

Then, image augmentation of an extrapolated region can be performed by rotating the input image by 0°, 90°, 180°, and 270°. Accordingly, extrapolation in four directions is possible using one model by the method for adaptively extrapolating an image according to an embodiment.

The empty boundary regions may be filled one by one with sequentially selected candidate patches. The previously selected candidate patch serves as a node patch for patch selection in the next selection round. Various orders of sequential selection can be used, but in an embodiment, a left-to-right and matrix approach was applied to select the best candidate patch, but is not limited thereto.

For a specific blank patch, the optimal patch to be inserted into a pool of extrapolated region is selected among the candidate patches depending on the distance between the graph-based target feature $\tilde{v}$ and the patch-based feature $x_i \in X$ of each candidate patch, In an embodiment, a boundary difference between the adjacent patch and the candidate patch is considered to select a patch to be inserted into the pool of extrapolated region. In this case, the boundary difference is an average of the intensity distances between boundary pixels of the candidate patch and adjacent pixels of the selected image, and the total distance can be derived by Equation 4 as follows.

$$\Omega(I, x_i) = \delta(I, x_i) + \lambda \|\tilde{v} - x_i\|_2 \quad \text{[Equation 4]}$$

Here I is a previously selected image and $\delta(I, x_i)$ is the boundary distance between I and $x_i$. $\lambda$ is a preset hyperparameter. Then, Ω(I, x_i) is estimated to select the optimal patch with the smallest Ω(I, x_i) for all possible $x_i \in X$.

Then, a process of filling the left boundary by rotating the input image 90 degrees clockwise and a process of filling the right boundary by rotating the input image 90 degrees counterclockwise are repeatedly performed. Then, the lower boundary is filled using an image with both left and right boundaries filled, and the upper boundary may be completed in the same way by rotating the image 180 degrees.

In an additional aspect, even if a candidate patch generally expands the input image well, there is a risk that grid-shaped artifacts may appear along the boundaries of the selected patch. In order to solve this phenomenon, a function of masking a region to be refined and generating a region using a pre-trained stable-diffusion inpainting model may be further performed.

First, it is detected whether grid-shaped artifacts exist for all patches. To detect grid-shaped artifacts, based on the fact that a large gradient size can be caused in certain patches, it can be supplemented by a mechanism using a Sobel filter. Specifically, $3 \times_3$ Sobel filter in the x-direction and y-direction may be applied to the candidate patches and an average of 2-norm size values may be obtained for each patch. Next, a mask is constructed to identify pixels within the patch whose average value exceeds a threshold value indicated by $\lambda_{th}$.

In an embodiment, since the raw resolution and texture details of the initial result image should be preserved, a pure diffusion model should be selected to generate masked pixels. Since the pure diffusion model operates only in a diffusion phase and not in an upsampling phase, the original image can be fed directly into a generative model, and thus the raw resolution and texture details thereof are preserved.

According to an embodiment, the problem of extrapolation task can be solved through accurate reconstruction by strategically placing numerous candidate patches within an empty region.

Figure 3:
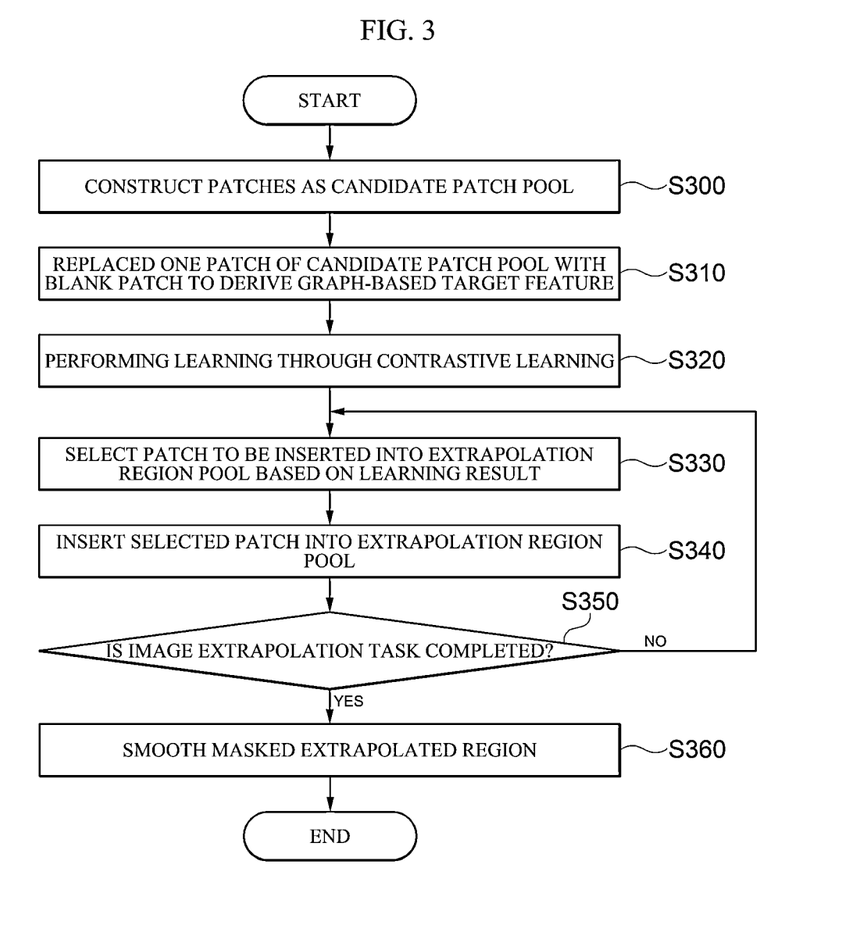
FIG. 3 is a flowchart of a method for adaptively extrapolating an image through graph-based patch rearrangement according to an embodiment of the present disclosure.

FIG. 3 is a flowchart of a method for adaptively extrapolating an image through graph-based patch rearrangement according to an embodiment of the present disclosure.

In the method for adaptively extrapolating an image through graph-based patch rearrangement according to an embodiment, an input image is divided into a grid pattern and patches of at least some regions are constructed as a pool of candidate patches (S300).

Among the patches divided into grids in the input image, patches having at least some random coordinates may be constructed as a pool of candidate patches.

The patches are converted into feature vectors by being input to an encoder that can recognize images by learning spatial relationships. The patches can be converted into n feature vectors in other regions so as not to overlap with) random coordinates.

Then, one patch of the constructed pool of candidate patches is replaced with a blank patch to derive the graph-based target feature (S310).

The blank patch is implemented as an uninformative patch of the same size as the patches included in the pool of candidate patches. In the step of deriving the graph-based target feature, vector values of the blank patches are applied to derive an adjacency matrix representing a bidirectional connection between patches or a unidirectional connection between the blank patch and other patches.

That is, in order to select the optimal patch to replace a specific blank region, that is, a blank patch, the graph-based target feature is extracted using adjacent patches of the blank patch. A graph can be created using the upper, left, and upper-left patches of the blank patch. In this case, since information cannot be derived from the blank patch, an adjacency matrix is derived to exclude directional connections from the blank patch to adjacent patches and indicate unidirectional connections.

In an embodiment, the graph contains four nodes with one fixed adjacency matrix. Node features are extracted by feeding patches to the pre-trained CNN that is used for extraction of candidate features, and the features of the upper left-hand, upper, left-hand, and blank patches can be denoted as $v_1$, $v_2$, $v_3$, and $v_4$.

Node feature matrix V can be defined as the following equation.

$$V^{(l+1)} = \tilde{D}^{-\frac{1}{2}} \tilde{A} \tilde{D}^{-\frac{1}{2}} V^{(l)} W$$

Here, $\tilde{A}$ is an adjacency matrix added by self-connection from A (adjacency matrix), $\tilde{D}$ is a diagonal matrix of $\tilde{A}(\tilde{D}(K, k) = \Sigma_j \tilde{A}(k,j)$, $W \in R^{D \times D}$ is a learnable weight matrix, I is an index of the GCN layer, V(0)=V.

In addition, the graph-based target feature can be defined as follows.

$$\tilde{v} = \tau(\mathbb{E}_{i \in \{1,\ldots,4\}} g(V_i^{(L)}))$$

$V_i(L)$ is an i-th row vector of V(L), L is the number of GCN layers, g(·) is a linear projection layer, and τ(·) is an ReLU activation function.

The adjacency matrix and node feature information generated to derive graph-based features are input into the GCN, and features reflecting blank patch nodes can be output as a GCN expression vector.

After that, through contrastive learning between the derived graph-based target feature, the feature of the patch replaced with the blank patch, and features derived from regions other than the pool of candidate patches, learning is performed so that it is closer to the feature of the patch replaced by the blank patch and farther away from the features derived from regions other than the pool of candidate patches (S320).

In one aspect, in the step of learning, the contrastive learning is performed using the following equation.

$$\mathcal{L}_{tri} = \sum_{i=1}^{N} \left[ \|\tilde{v}_i - x_i^p\|_2^2 - \sum_{j=1}^{M} \|\tilde{v}_i - x_j^n\|_2^2 + \zeta \right]_+$$

Here, $[\cdot]_+$ is a function that makes all negative values 0 while maintaining positive values, $\zeta$ represents a preset margin for triplet loss, M is the number of negative samples $x_j^n$, and N is a batch size.

By using this equation, learning can be performed so that it is closer to the features of the patch replaced by the blank patch and farther away from the features derived from regions other than the pool of candidate patches.

Then, based on the learning result, one of the patches included in the input image is selected as the patch to be inserted into a grid-based pool of extrapolated region (S330).

In one aspect, a patch that has the smallest sum of the distance between pixel values of an edge and other adjacent patches that are encountered when inserted into the pool of extrapolated region and distance between the patch features is selected.

In this case, in the step of selecting, the patch to be inserted into the pool of extrapolated region can be selected using the following equation.

$$\Omega(I, x_i) = \delta(I, x_i) + \lambda \|\tilde{v} - x_i\|_2$$

Here I is a previously selected image and $\delta(I, x_i)$ is the boundary distance between I and $x_i$.

After that, the image can be expanded by repeatedly performing the step of selecting by inserting the selected patch to be inserted into the pool of extrapolated region (S340) and reselecting the pool of extrapolated region.

After that, until the extrapolation task is completed (S350), a Sobel filter is applied to an extrapolated region, and if the result value is greater than or equal to a threshold, the extrapolated region is masked and smoothed.

Figure 4:
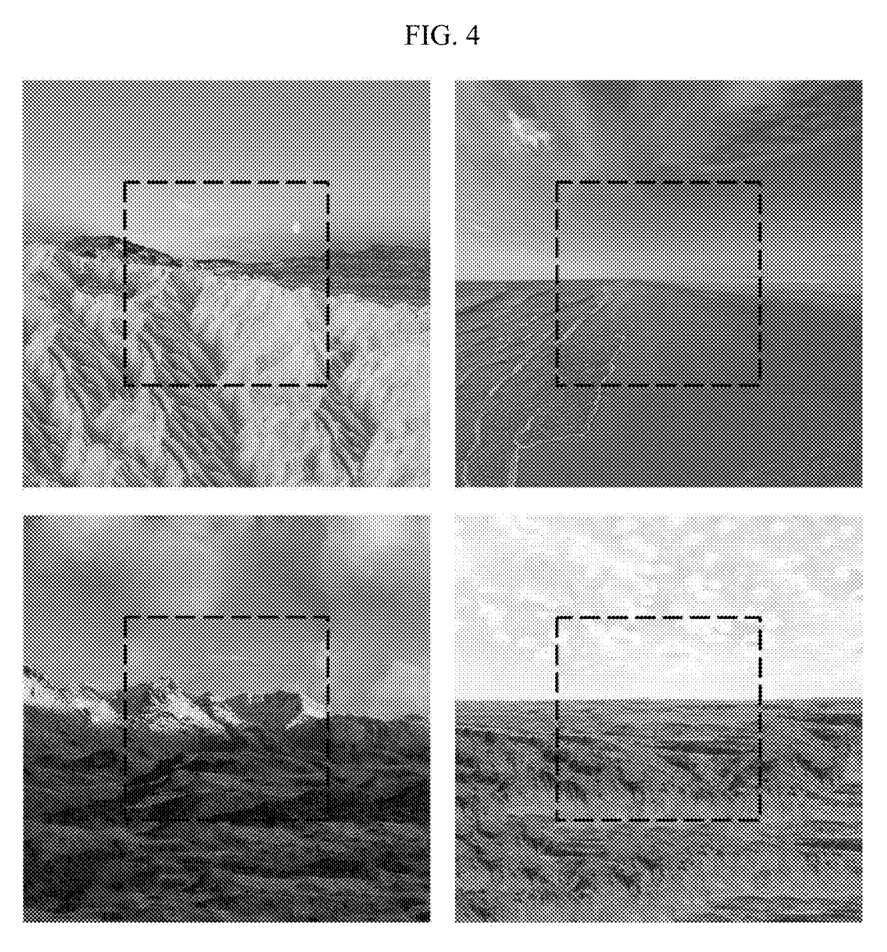
FIG. 4 is an exemplary diagram of final results by a method for adaptively extrapolating an image according to an embodiment.

FIG. 4 is an exemplary diagram of the final result by the method for adaptively extrapolating an image according to an embodiment. A region indicated by a black dotted line is an original input image region, and it can be seen that an extrapolation result image with texture details preserved at the raw resolution is obtained. That is, it is possible to provide high-quality extrapolation results that are quantitatively and qualitatively superior to previous state-of-the-art methods, and process various resolutions for a generated image without additional learning by reducing the possibility of error accumulation by rearranging given patches. In other words, TPRNet, a novel deep learning-based extrapolation mechanism that preserves the raw resolution and texture details of the input image by reusing patch-based visual information can be proposed.

Figure 5:
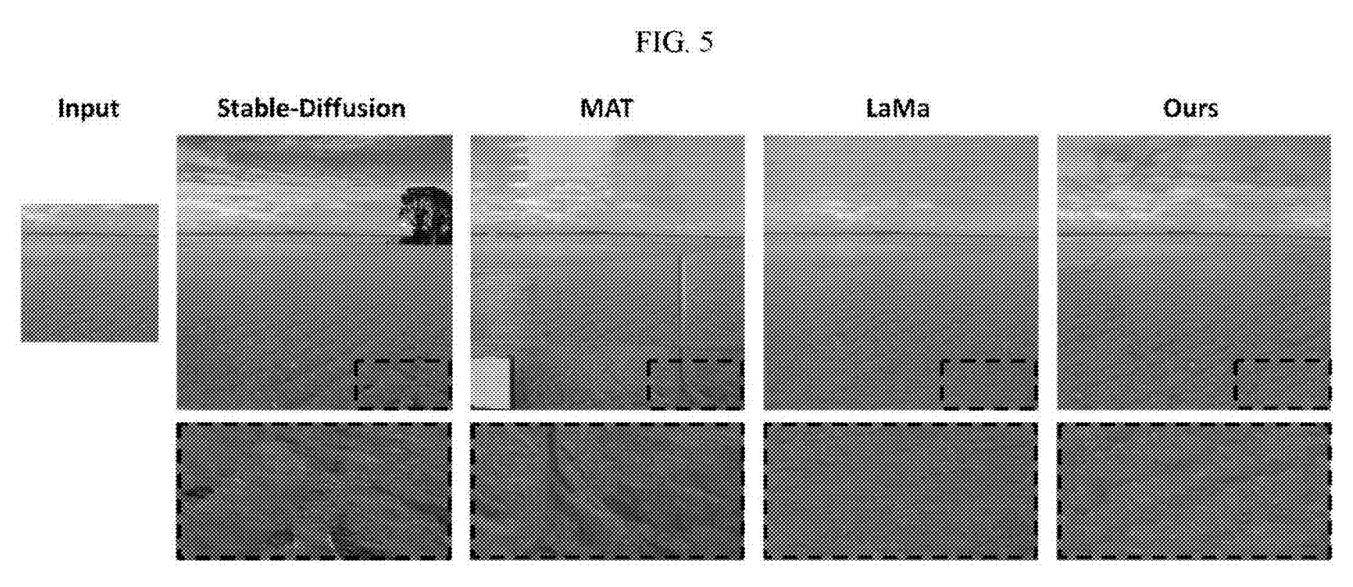
FIGS. 5 and 6 are exemplary diagrams for describing the effect derived by the method for adaptively extrapolating an image according to an embodiment of the present disclosure.
Figure 6:
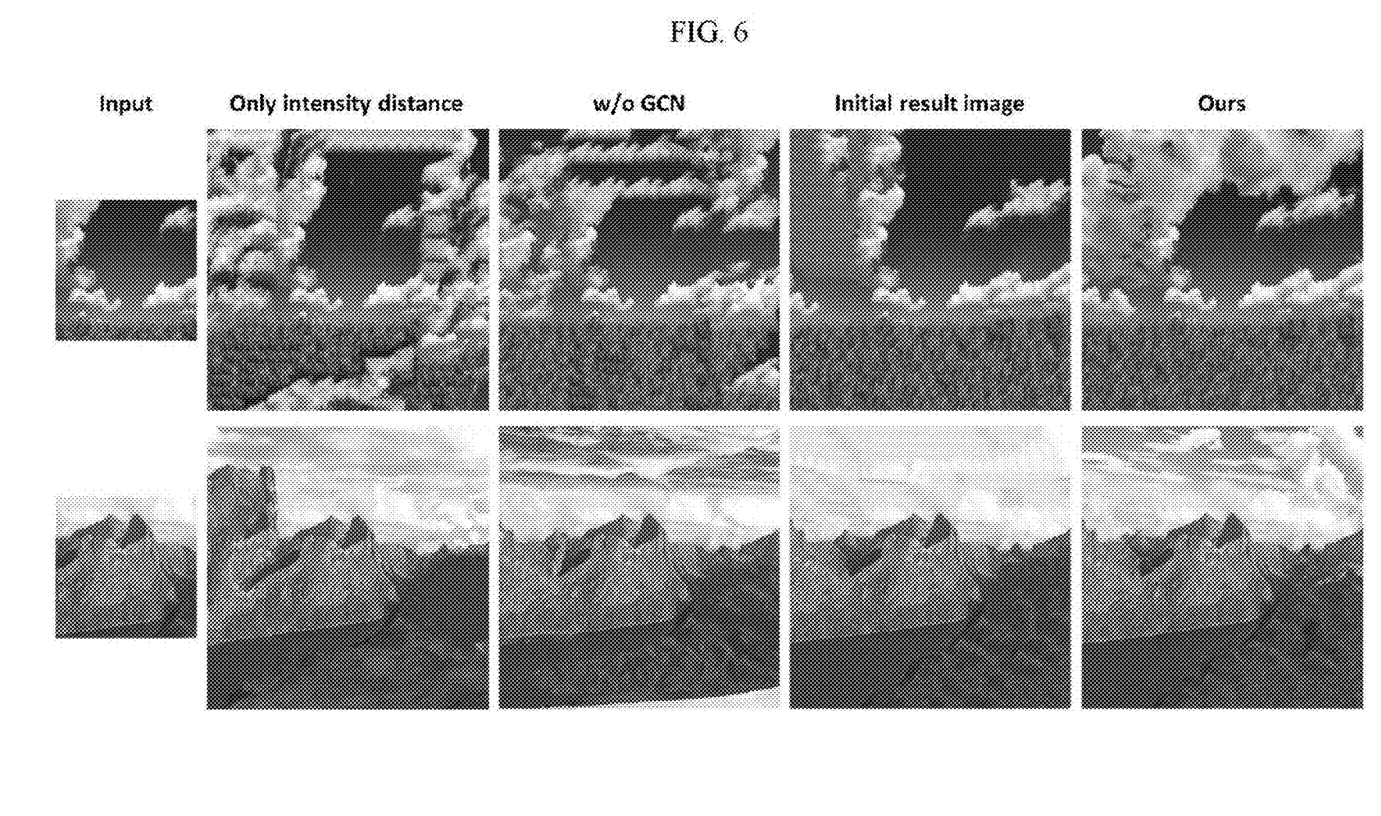

FIGS. 5 and 6 are exemplary diagrams for describing the effect derived by the method for adaptively extrapolating an image according to an embodiment of the present disclosure.

FIG. 5 shows images obtained by performing a comparison between the results obtained by the adaptive extrapolation method according to an embodiment and the results obtained by another estimation algorithm, using the same input image.

Below each image, the result of replicating the region surrounded by the dotted line is shown. It can be seen that the result Ours obtained by the method for adaptively extrapolating an image according to an embodiment generate an image result with consistent texture and tissue details, unlike the results obtained by other methods in which images with textures that are inconsistent with the input image or tissues that are not connected to the input image are generated which results in missing of texture details.

In FIG. 6, it can be seen that the effect of eliminating unnaturalness that appears in the image of 'only intensity distance' by applying graph and patch-based features, it is possible to check. The graph synthesis neural network (GCN) proposed by the method for adaptively extrapolating an image according to an embodiment can preserve context information consistently with the input image for the extrapolated region of the image by considering its global structure. In addition, as in the final result image Ours compared to the initial result image, an improved effect can be seen in which artifacts can also be effectively removed.

The above-described method may be implemented as an application or implemented in the form of program instructions that can be executed through various computer components and recorded on a computer-readable recording medium. The computer-readable recording medium may include program instructions, data files, data structures, etc., individually or in combination.

The program instructions recorded on the computer-readable recording medium may be specially designed and configured for the present disclosure, and may also be known and usable by those skilled in the computer software field.

Examples of the computer-readable recording media include hardware devices specifically configured to store and perform program instructions, such as magnetic media such as hard disks, floppy disks, and magnetic tapes, optical recording media such as CD-ROMs and DVDs, magneto-optical media such as floptical disks, ROMs, RAMs, flash memories, etc.

Examples of the program instructions include not only machine language code such as that produced by a compiler, but also high-level language code that can be executed by a computer using an interpreter, etc. The hardware device may be configured to operate as one or more software modules to perform processing according to the present disclosure and vice versa.

Although description has been made with reference to embodiments, those skilled in the art will understand that various modifications and changes may be made to the present disclosure without departing from the spirit and scope of the present disclosure as set forth in the claims below.

What is claimed is:

1. A method for adaptively extrapolating an image, which is performed on a computing device including one or more processors and a memory that stores one or more programs to be executed by the one or more processors, the method comprising:

dividing an input image into a grid pattern and constructing patches of at least some regions as a pool of candidate patches;

deriving a graph-based target feature by replacing one patch in the constructed pool of candidate patches with a blank patch;

performing learning so that the derived graph-based target feature is to be closer to a feature of the patch replaced by the blank patch than a feature derived from the regions other than the pool of candidate patches and farther away from the feature derived from regions other than the pool of candidate patches than the feature of the patch replaced by the blank patch through contrastive learning between the derived graph-based target feature, the feature of the patch replaced by the blank patch, and the feature derived from the regions other than the pool of candidate patches;

selecting one of the patches included in the input image as a patch to be inserted into a grid-based pool of extrapolated region based on the learning result; and repeatedly performing the selecting by inserting the selected patch to be inserted into the pool of extrapolated region and reselecting a pool of extrapolated region, wherein in the selecting, a patch that has the smallest sum of a distance between pixel values of an edge of the patch and those of other adjacent patches that are encountered when inserted into the pool of extrapolated region and a distance between patch features of the patch and those of other adjacent patches is selected from among patches included in the input image.

2. The method of claim 1, wherein, in the learning, contrast learning is performed using the following equation:

$$\mathcal{L}_{tri} = \sum_{i=1}^{N} \left[ \|\tilde{v}_i - x_i^p\|_2^2 - \sum_{j=1}^{M} \|\tilde{v}_i - x_j^n\|_2^2 + \zeta \right]_+ \quad \text{[Equation]}$$

where, $[\cdot]_+$ is a function that makes all negative values 0 while maintaining positive values, $\zeta$ is a preset margin for triplet loss, M is the number of negative samples $x_j^n$, N is a batch size, $\widetilde{v}_i$ is an i-th graph-based target feature, $x_i^p$ is a positive sample of an i-th graph-based target feature, and $x_j^n$ is a negative sample of the i-th graph-based target feature.

3. The method of claim 2, wherein, in the selecting, the patch to be inserted into the pool of extrapolated region is selected according to the following equation:

$$\Omega(I,x_i)=\delta(I,x_i)+\lambda\|\widetilde{v}-x_i\|_2 \quad \text{[Equation]}$$

where, I is a previously selected image, $\delta(I, x_i)$ is a boundary distance between I and $x_i$, and $\lambda$ is a preset hyperparameter.

4. The method of claim 1, wherein, in the deriving of the graph-based target feature, vector values of the blank patch are applied to derive an adjacency matrix representing a bidirectional connection between patches or a unidirectional connection between the blank patch and other patches.

5. The method of claim 1, wherein, in the deriving of the graph-based target feature, a node feature matrix is constructed by replacing one patch in the pool of candidate patches with the blank patch, and the node feature matrix V is expressed as the following equation:

$$V^{(l+1)}=\tilde{D}^{-1/2}\tilde{A}\tilde{D}^{-1/2}V_{(l)}W \quad \text{[Equation]}$$

where, $\tilde{A}$ is an adjacency matrix added by self-connection from an adjacency matrix A, $\tilde{D}$ is a diagonal matrix of $\tilde{A}$, W is a learnable weight matrix, and l is an index of a graph convolutional network (GCN) layer.

6. The method of claim 5, wherein, in the deriving of the graph-based target feature, the graph-based target feature is expressed as the following equation:

$$\tilde{v}=\tau(E_{i\in\{1,2,3,4,\}}g(V_i(L))) \quad \text{[Equation]}$$

$V_i(L)$ is an i-th row vector of V(L),

L is the number of GCN layers, $g(\cdot)$ is a linear projection layer, and $\tau(\cdot)$ is an ReLU activation function.

7. The method of claim 1, wherein, a Sobel filter is applied to an extrapolated region, and if the result value is greater than or equal to a threshold, the extrapolated region is masked and smoothed.

8. An apparatus for adaptively extrapolating an image, which is a computer device including one or more processors and a memory that stores one or more programs to be executed by the one or more processors, the apparatus comprising:

a construction module configured to divide an input image into a grid pattern and construct patches of at least some areas as a pool of candidate patches;

a derivation module configured to derive a graph-based target feature by replacing one patch in the constructed pool of candidate patches with a blank patch;

a learning module configured to perform learning so that it is to be closer to a feature of the patch replaced by the blank patch and farther away from features derived from regions other than the pool of candidate patches through contrastive learning between the derived graph-based target feature, the feature of the patch replaced by the blank patch, and the feature derived from the regions other than the pool of candidate patches;

a selection module configured to select one of the patches included in the input image as a patch to be inserted into a grid-based pool of extrapolated region based on the learning result; and an insertion module configured to repeatedly perform the selection of the patch to be inserted into the pool of extrapolated region by inserting the selected patch to be inserted into the pool of extrapolated region and reselecting a pool of extrapolated region.

9. A computer program stored on a non-transitory computer readable storage medium, the computer program including one or more instructions that, when executed by a computing device including one or more processors, cause the computing device to perform:

dividing an input image into a grid pattern and constructing patches of at least some regions as a pool of candidate patches;

deriving a graph-based target feature by replacing one patch in the constructed pool of candidate patches with a blank patch;

performing learning so that it is to be closer to a feature of the patch replaced by the blank patch and farther away from features derived from regions other than the pool of candidate patches through contrastive learning between the derived graph-based target feature, the feature of the patch replaced by the blank patch, and the feature derived from the regions other than the pool of candidate patches;

selecting one of the patches included in the input image as a patch to be inserted into a grid-based pool of extrapolated region based on the learning result; and repeatedly performing the selecting by inserting the selected patch to be inserted into the pool of extrapolated region and reselecting a pool of extrapolated region, wherein in the selecting, a patch that has the smallest sum of a distance between pixel values of an edge of the patch and those of other adjacent patches that are encountered when inserted into the pool of extrapolated region and a distance between patch features of the patch and those of other adjacent patches is selected from among patches included in the input image.

* * * * *